| United States Patent [19] | [11] | 4,340,641 |
|---|---|---|
| Weiner | [45] | * Jul. 20, 1982 |

[54] HEAT SEALABLE PACKAGING FILM COMPRISING PROPYLENE POLYMER SUBSTRATE AND A SURFACE LAYER BLEND OF ETHYLENE COPOLYMER AND PROPYLENE COPOLYMER

[75] Inventor: Milton L. Weiner, Rochester, N.Y.

[73] Assignee: Mobil Oil Corporation, New York, N.Y.

[*] Notice: The portion of the term of this patent subsequent to Oct. 27, 1998, has been disclaimed.

[21] Appl. No.: 202,974

[22] Filed: Nov. 3, 1980

Related U.S. Application Data

[62] Division of Ser. No. 82,344, Oct. 5, 1979, Pat. No. 4,291,092.

[51] Int. Cl.$^3$ .............................................. B32B 27/00
[52] U.S. Cl. ................................... 428/349; 428/516; 428/523; 526/348.6
[58] Field of Search ............................... 428/516, 349; 526/348.6

[56] References Cited

U.S. PATENT DOCUMENTS 4,205,021  5/1980  Morita et al. .................... 526/348.6
4,297,411  10/1981  Weiner ............................... 428/347

*Primary Examiner*—George F. Lesmes
*Assistant Examiner*—E. Rollins Buffalow
*Attorney, Agent, or Firm*—Charles A. Huggett; Edward J. Trojnar; John K. AboKhair

[57] ABSTRACT

Multiple layer, heat sealable films are described comprising a substrate layer of polypropylene homopolymers or copolymers, or blends thereof with compatible polyolefins, and at least one heat sealable surface layer of a blend of a copolymer of ethylene and a higher olefin, and a copolymer of propylene and a higher olefin. The films are prepared by extrusion coating or coextrusion and can be oriented.

4 Claims, No Drawings

HEAT SEALABLE PACKAGING FILM COMPRISING PROPYLENE POLYMER SUBSTRATE AND A SURFACE LAYER BLEND OF ETHYLENE COPOLYMER AND PROPYLENE COPOLYMER

This is a division of copending application Ser. No. 082,344, filed Oct. 5, 1979, now U.S. Pat. No. 4,291,092.

SUMMARY OF THE INVENTION

This invention relates to mulit-layer films having a wide range of heat sealing temperatures. The films comprise a core or substrate of propylene homopolymer, a copolymer of propylene and another olefin or a blend of the foregoing with up to 40% by weight of a different compatible polyolefin, and a surface layer on one or both sides of the substrate. The different compatible polyolefin is preferably the same polyolefin blend which is used for the surface layer. The heat-sealable layer which is present on either one or both sides of the substrate is a blend of a copolymer of ethylene and a higher olefin and a copolymer of propylene and a higher olefin.

The films of this invention can be produced by coextrusion of the surface layer material and the substrate material followed by biaxial orientation. Alternatively, the substrate can be extruded alone, stretched in the machine direction, then extrusion coated with the surface layer material and finally stretched perpendicular to the machine direction.

DETAILED DESCRIPTION OF THE INVENTION

Oriented polypropylene film has become a useful and widely used packaging film because of its good moisture barrier properties, stiffness, high-strength, and good optical properties. For widest utility, it is desired that the films be capable of being heat sealed over a broad range of temperatures. One means to achieve heat-sealability has been the application of a heat-sealable coating to the surface. A separate coating operation following orientation, however, is quite costly.

An alternate and less costly method of achieving heat-sealability is the coextrusion of a surface layer on one or both surfaces of a substrate. The surface layer is selected so it melts at a lower temperature than the underlying substrate. Coextruded oriented films have been prepared in which the oriented polypropylene substrate or core is encased in skins comprised of ethylene/propylene copolymer, butenel homopolymer or butene-1/ethylene copolymer, for instance. Such films are described in U.S. Pat. No. 4,125,662.

Many of the prior art films exhibit high seal strengths but because of the relatively high melting point of the surface layer, the temperature range over which usable heat seals are formed is narrow. A narrow sealing range severely limits the utility of a packaging film. It is therefore one of the objects of this invention to provide multi-layer films which can be sealed over a wide range of temperatures and which have other desirable properties.

Another object of this invention is the provision of multi-layered sealable films which can be prepared without separate coating operations.

Still another object of this invention is the provision of films which have one layer which is heat-sealable over a wide range to provide a high-strength seal, over a substrate layer which is heat-sealable to itself to provide a weaker, but useful seal.

The films of this invention comprise a substrate which is polypropylene, propylene copolymer or a blend of polypropylene homopolymer or copolymer and up to 40 weight percent of a compatible polyolefin or polyolefin blend. The compatible polyolefin is advantageously the same blend as in the heat-sealable surface layer.

Copolymers of propylene useful as the substrate generally comprise propylene and another olefin comonomer such as ethylene, butene or higher olefins. Typically up to about 20 mole percent of the comonomer is used. Where the comonomer is ethylene, preferably up to 10 mole percent of the comonomer is present in the copolymer.

Polyolefin compositions which are suitable as the heat-sealable surface layer in accordance with this invention are:

(1) a blend of less than 25 weight percent or greater than 90 weight percent of a copolymer of ethylene (1–9.5 mole percent) and a higher olefin having 4 or more carbon atoms (99–90.5 mole percent), and greater than 75 weight percent or less than 10 weight percent of a copolymer of propylene (80–95 mole percent) and a higher olefin having 4 or more carbon atoms (20-5 mole percent);

(2) a blend of 5–95 weight percent of a copolymer of ethylene (1–9.5 mole percent) and a higher olefin having 4 or more carbon atoms (99-90.5 mole percent), and 95-5 weight percent of a copolymer of propylene (less than 80 mole percent or greater than 95 mole percent) and a higher olefin having 4 or more carbon atoms (greater than 20 or less than 5 mole percent);

(3) a blend of 86–95 weight percent or 5–14 weight percent of a copolymer of ethylene (75–90 mole percent) and a higher olefin having three or more carbon atoms (10–25 mole percent), and 14–5 weight percent or 95-86 weight percent of a copolymer of propylene (88–98 mole percent) and a higher olefin having 4 or more carbon atoms (2–12 mole percent); or (4) a blend of 76–95 weight percent of a copolymer of ethylene (75–90 mole percent) and a higher olefin having 3 or more carbon atoms (10–25 mole percent), and 5–24 weight percent of a copolymer of propylene (less than 88 mole percent) and a higher olefin having 4 or more carbon atoms (more than 12 mole percent).

The olefin monomer in the copolymers preferably contains up to 8 carbon atoms, e.g., propylene, 1-butene and 1-octene.

Methods of extrusion coating and coextrusion are well known in the art and are suitable for the production of the films of this invention. Advantageously, when extrusion coating is used, the substrate material is extruded above, stretched in the machine direction, extrusion coated with the surface material and then stretched perpendicularly to the machine direction. When coextrusion is utilized, the film obtained by coextrusion of the substrate material and the surface material is biaxially oriented. In either case, each surface layer constitutes 1–10% by weight of the total film.

For many applications two-layer films comprising a relatively high melting substrate layer and an easily sealable surface layer are particularly desirable. For example, where the film is used in packaging machinery such as devices known in the art as "horizontal form and fill" machines it is not only unnecessary but disadvantageous to have a film with two low melting sealable surfaces. This is because the surface not intended for sealing necessarily comes into contact with heated areas, for example heated platens, and if the surface layer not intended for primary sealing melts at too low a temperature sticking may occur resulting in machine malfunction. Sticking and its consequences is reduced with the two-layer films of this invention by virtue of the higher melting point of the substrate layer which can be selected for optimum properties.

In certain specific embodiments of this invention, the substrate film comprises a mixture of a homopolymer of polypropylene or a copolymer of polypropylene and a compatible polyolefin. The compatible polyolefin blend is preferably the same or similar polyolefin blend used for the surface layer. The result is a film in which the adhesion between the substrate layer and the surface layer or layers is excellent. An additional advantage of such a film having only two layers is that the surfaces of the substrate layer exhibit improved sealability to each other as well as to the surface layer. The heat sealability of the substrate layer surfaces to each other is of particular advantage in the production of bags with heat-sealed seams. While the seams forming the bag, as such, are made by heat sealing a surface layer to a surface layer, it is often desired that the substrate surface be sealable to itself. For example, this is desirable in the area of the "flaps" where a bag is made with a seal at the top, at the bottom and along the back. It is considered undesirable that the "flap" resulting from the seal at the back of the bag protrude from the surface of the bag. With the two-layer films of this invention containing a proportion of the surface layer polymer in the substrate layer it is possible to obtain a useful degree of sealability of the substrate layer to itself where the flap meets the top and bottom of the bag. The strength of this seal between substrate surfaces is not nearly as strong as the strength of the seal between the surface layers but is sufficient to adhere the flap to the top and bottom edges of the bag.

The invention is illustrated by the following Examples.

EXAMPLE 1

A surface layer comprising a blend of 20 weight percent of a copolymer of ethylene (8 mole percent) and 1-butene (92 mole percent), and 80 weight percent of a copolymer of propylene (85 mole percent) and 1-butene (15 mole percent) is coextruded with polypropylene homopolymer to form a three layer sheet having a polypropylene core and polyolefin blend layer as its outer surfaces. The three-layer film is solidified, heated to a temperature of 225°–295° F., stretched 5X in the machine direction, heated to a temperature of 300°–330° F., and stretched 8X in the transverse direction. The thickness of each surface layer is 0.025 mil and that of the total film is 1.0 mil.

EXAMPLES 2–4

Example 1 is repeated except that the following blends are substituted for the blend used in Example 1.

EXAMPLE

2: A blend of 45 weight percent of a copolymer of ethylene (5 mole percent) and 1-butene (95 mole percent), and 55 weight percent of a copolymer of propylene (75 mole percent) and 1-butene (25 mole percent).
3: A blend of 87 weight percent of a copolymer of ethylene (89 mole percent) and 1-butene (11 mole percent), and 13 weight percent of a copolymer of propylene (89 mole percent) and 1-butene (11 mole percent).
4: A blend of 80 weight percent of a copolymer of ethylene (89 mole percent) and 1-butene (11 mole percent), and 20 weight percent of a copolymer of propylene (87 mole percent) and 1-butene (13 mole percent).

EXAMPLES 5–8

Each of the blends of Examples 1–4 is extrusion coated as a surface layer on a polypropylene homopolymer substrate. The polypropylene sheet is preformed by extrusion, is solidified, heated to a temperature of 265°–295° F., stretched 6X in the MD direction, and the extrusion coated on one surface with each of the above described surface layer blends. The coated material is then stretched transversely 8X at a temperature of 300°–330° F. The thickness of the film is 1.25 mils and that of the surface layer is 0.02 mil.

EXAMPLES 9–12

The procedure of Examples 5–8 is followed except that the substrate sheet is a mixture of 80% polypropylene and 20% of the surface layer blend and the substrate sheet is heated to a temperature of 225°–295° F. prior to machine direction orientation.

I claim:
1. A multiple-layer, heat-sealable film comprising;
   (a) a substrate layer consisting essentially of a homopolymer of polypropylene or a copolymer of polypropylene which is blended with up to 40 weight % of a different compatible polyolefin; and
   (b) on one of the surfaces of the substrate layer, a surface layer comprising a blend of 5–95 wt. % of a copolymer of ethylene (1–9.5 mole %) and a higher olefin having 4 or more carbon atoms (99–90.5 mole %), and a 95–5 wt. % copolymer of propylene (less than 80 mole % or greater than 95 mole %) and a higher olefin having 4 or more carbon atoms (greater than 20 mole % or less than 5 mole %);
   in which said different compatible polyolefin in the substrate corresponds to said surface layer blend.
2. The multiple-layer, heat-sealable film of claim 1 in which the substrate is polypropylene homopolymer blended with 1–40% by weight of the surface layer blend.
3. The multiple-layer, heat-sealable film of claim 1 in which the substrate is polypropylene copolymer comprising propylene and up to 10 mole percent of ethylene blended with 1–40% by weight of the surface layer blend.
4. The multiple-layer, heat-sealable film of claim 1 in which the substrate is polypropylene copolymer comprising propylene and up to 20 mole percent of a higher alpha-olefin blended with 1–40% by weight of the surface layer blend.

* * * * *